United States Patent [19]

Hori

[11] Patent Number: 5,699,976

[45] Date of Patent: Dec. 23, 1997

[54] GEAR MECHANISM AND PRETENSIONER

[75] Inventor: Seiji Hori, Aichi-ken, Japan

[73] Assignee: Kabushiki Kaisha Tokai-Rika-Denki-Seisakusho, Aichi-Ken, Japan

[21] Appl. No.: 689,242

[22] Filed: Aug. 7, 1996

[30] Foreign Application Priority Data

Aug. 31, 1995 [JP] Japan ................... 7-223733

[51] Int. Cl.[6] ................................................ B60R 22/46
[52] U.S. Cl. ................................................ 242/374
[58] Field of Search .................. 242/374; 280/805, 280/806, 807

[56] References Cited

U.S. PATENT DOCUMENTS

| | | | |
|---|---|---|---|
| 5,489,072 | 2/1996 | Gordon et al. | 242/374 |
| 5,505,399 | 4/1996 | Schmid et al. | 242/374 |
| 5,529,258 | 6/1996 | Dybro et al. | 242/374 |
| 5,553,890 | 9/1996 | Buhr et al. | 280/806 |

FOREIGN PATENT DOCUMENTS

| | | | |
|---|---|---|---|
| 42 22 993 A1 | 1/1994 | Germany | 280/806 |
| 42 27 781 A1 | 2/1994 | Germany | 280/806 |
| 55-21695 | 5/1980 | Japan . | |
| 345446 | 2/1991 | Japan . | |
| 429461 | 3/1992 | Japan . | |
| 2 262 874 | 7/1993 | United Kingdom | 280/806 |

*Primary Examiner*—John P. Darling
*Attorney, Agent, or Firm*—Sixbey Friedman Leedom & Ferguson; Thomas W. Cole

[57] ABSTRACT

A gear mechanism includes a sun gear, a planetary gear, an internal gear and a cam gear. The planetary gear is disposed so as to continuously engage the sun gear. When the gear mechanism is operated, the planetary gear revolves around the sun gear while rotating on its own axis. The internal gear is disposed so as to be movable in a direction perpendicular to the axis of the sun gear so as to engage the planetary gear. The internal gear is kept apart from the planetary gear when the gear mechanism is non-operated and engages the planetary gear when the gear mechanism is operated. The cam gear rotatably supports the planetary gear. Upon receiving an external driving force, the cam gear moves the internal gear in a direction perpendicular to the axis of the sun gear so as to engage the internal gear with the planetary gear. The cam gear is rotated so as to revolve the planetary gear around the sun gear.

20 Claims, 4 Drawing Sheets

GEAR MECHANISM AND PRETENSIONER

BACKGROUND OF THE INVENTION

1. Field of the Invention

The present invention relates to a gear mechanism wherein a driving gear and a sun gear are kept apart from each other in the off state, in which the gear mechanism is not operating, and wherein the driving gear and the sun gear are engaged with each other in the on state, in which the gear mechanism is operating. The present invention also relates to a pretensioner which tenses, upon rapid deceleration of a vehicle, a webbing in the direction of restraining a passenger, thereby tightly fastening the webbing onto the passenger.

2. Description of the Related Art

A gear mechanism is known wherein a sun gear is kept apart from a driving gear in the off state and engaged with the driving gear in the on state. For example, in some cases, this gear mechanism is employed as a clutch mechanism for a pretensioner which retracts, upon rapid deceleration of a vehicle, a webbing applied to a passenger by a predetermined amount so as to apply tensile force to the webbing. This pretensioner is designed to allow the webbing to be freely taken up or drawn out without hindering rotation of a winding shaft in the off state, i.e. while the vehicle is traveling in a normal manner, and designed to transmit a rotary winding force of the pretensioner to the webbing winding shaft via the clutch mechanism connected to the webbing winding shaft in the on state, i.e. upon rapid deceleration of the vehicle, thereby winding up the webbing in the direction of restraining a passenger.

That is, in some pretensioners, upon rapid deceleration of a vehicle, a gear or rack serving as a driving member is quickly rotated or moved to engage a sun gear, which is part of a clutch mechanism, thereby rotating a webbing winding shaft which rotates integrally with the sun gear. In detail, the driving gear or rack is kept apart from the sun gear connected to the webbing winding shaft while the vehicle is traveling in a normal manner; upon rapid deceleration of the vehicle, the driving gear or rack is rotated or moved to engage the sun gear (Japanese Patent Application Laid-Open (JP-A) No. 3-45446 and Japanese Utility Model Application Publication (JP-Y) No. 55-21695).

In the above-mentioned pretensioners (or gear mechanism), since upon rapid deceleration of a vehicle the sidewall of the driving gear or rack abruptly collides with the sidewall of a gear of the winding shaft, the teeth of the driving gear or rack must has an increased strength to sustain a load due to the collision. This increase in strength of the gear teeth may be attained, for example, by increasing the size of the gear teeth or making the driving gear or rack of an expensive material having a higher impact strength. This, however, results in a higher-cost pretensioner.

SUMMARY OF THE INVENTION

In view of the foregoing, it is an object of the present invention to provide a gear mechanism capable of relaxing collision between gears.

Another object of the present invention is to provide a low-cost pretensioner capable of smoothly winding a webbing upon rapid deceleration of a vehicle.

According to a first aspect of the present invention, there is provided a gear mechanism having a sun gear, a planetary gear, an internal gear, and a cam gear. The planetary gear is disposed so as to continuously engage the sun gear. The planetary gear revolves around the sun gear while rotating on its own axis when the gear mechanism is operated. The internal gear is disposed so as to be movable in a direction perpendicular to the axis of the sun gear so as to engage the planetary gear. The internal gear is kept apart from the planetary gear when the gear mechanism is non-operated and engages the planetary gear when the gear mechanism is operated. The cam gear rotatably supports the planetary gear. Upon receiving an external driving force, the cam gear moves the internal gear in a direction perpendicular to the axis of the sun gear so as to engage the internal gear with the planetary gear. The cam gear is rotated so as to revolve the planetary gear around the sun gear.

According to a second aspect of the present invention, there is provided a pretensioner which, upon rapid deceleration of a vehicle, pulls a webbing in the direction of restraining a passenger. The pretensioner includes a sun gear, a planetary gear, an internal gear, and a cam gear. The sun gear serves to apply a tensile force to a portion of the webbing. The planetary gear is disposed so as to continuously engage the sun gear. The planetary gear revolves around the sun gear while rotating on its own axis upon rapid deceleration of the vehicle. The internal gear is disposed so as to be movable in a direction perpendicular to the axis of the sun gear so as to engage the planetary gear. The internal gear is kept apart from the planetary gear during the normal state of the vehicle and engages the planetary gear upon rapid deceleration of the vehicle. The cam gear rotatably supports the planetary gear. Upon rapid deceleration of the vehicle, the cam gear receives an external driving force to move the internal gear in a direction perpendicular to the axis of the sun gear so that the internal gear engages the planetary gear. The cam gear is rotated so as to revolve the planetary gear around the sun gear.

According to a third aspect of the present invention, there is provided a pretensioner which, upon rapid deceleration of a vehicle, pulls the webbing in the direction of restraining a passenger, by forcibly rotating a winding shaft for winding up a webbing. The pretensioner includes a sun gear, a planetary gear, an internal gear, and a cam gear. The sun gear is connected to the winding shaft and rotates integrally with the winding shaft. The planetary gear is disposed so as to continuously engage the sun gear. The planetary gear revolves around the sun gear while rotating on its own axis upon rapid deceleration of the vehicle. The internal gear has an abutting portion and is disposed so as to be movable in a direction perpendicular to the axis of the sun gear so as to engage the planetary gear. The internal gear is kept apart from the planetary gear when the vehicle is in a normal state and engages the planetary gear upon rapid deceleration of the vehicle. The cam gear rotatably supports the planetary gear and has a cam portion abuttable with the abutting portion of the internal gear. When the vehicle is in the normal state, the cam portion maintains abutment between the cam portion and the abutting portion so as to keep the internal gear apart from the planetary gear. Upon rapid deceleration of the vehicle, the cam gear receives an external driving force so as to cancel engagement between the cam portion and the abutting portion. The cam gear moves the internal gear in a direction perpendicular to the axis of the sun gear so as to engage the internal gear with the planetary gear, and is rotated so as to revolve the planetary gear around the sun gear.

As described above, the gear mechanism according to the present invention relaxes a collision of the internal gear with the planetary. Also, the pretensioner according to the present invention can be manufactured at low cost and can smoothly wind up a webbing upon rapid deceleration of a vehicle.

DESCRIPTION OF THE PREFERRED EMBODIMENT

Figure 1:
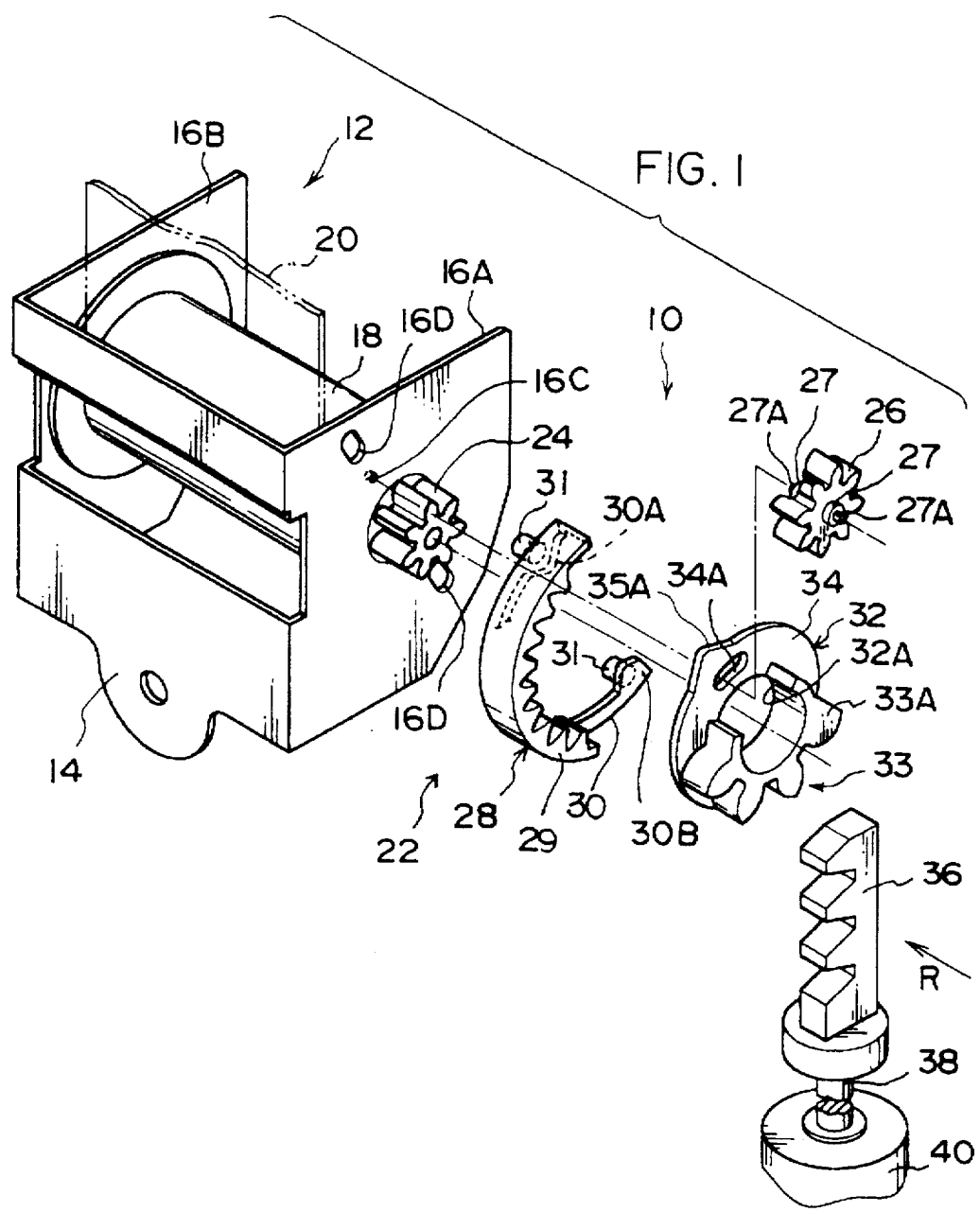
FIG. 1 is a perspective view showing a webbing retractor including the clutch portion of a pretensioner according to an embodiment of the present invention.

FIG. 1 perspectively shows a webbing retractor 12 having a pretensioner 10 according to an embodiment of the present invention.

The webbing retractor 12 has a plate 14 fixed onto a vehicle, and a pair of sidewalls 16A and 16B, which stand at both sides of the plate 14 at a right angle to the plate 14 and in parallel with each other and which are formed by so bending both side portions of the plate 14. The sidewalls 16A and 16B rotatably support a webbing winding shaft (hereinafter referred to as a "winding shaft") 18 therebetween. One end of a webbing 20 for holding a passenger in a seat is anchored onto the winding shaft 18, and the webbing 20 is taken up in layers onto the winding shaft 18.

A clutch portion 22 is disposed outside the sidewall 16A and at end portion of the winding shaft 18. The clutch portion 22 has a sun gear 24 disposed such that it projects outward from the sidewall 16A, a planetary gear 26 which is always engaged with the sun gear 24, an internal gear 28 disposed such that it can engage the planetary gear 26, and a cam gear 32 disposed such that it can engage the internal gear 28.

The sun gear 24 is disposed coaxially with the winding shaft 18 and rotates integrally with the winding shaft 18. The cam gear 32 includes a semicircular gear 33 and a ring-like plate 34, which are integrally formed together. The plate 34 is situated between the gear 33 and the sidewall 16A. A hole 32A is formed in the cam gear 32 at the center thereof. The sun gear 24 is inserted into the hole 32A. That is, the sun gear 24 is positioned inside the gear 33 and engages the planetary gear 26, which is positioned opposite to the sidewall 16A with respect to the plate 34.

A starting end gear 33A of the gear 33 is disposed so as to abut a rack 36, which is connected via a connection rod 38 to a piston 40 of the pretensioner 10. The piston 40 is slidably housed in an unillustrated cylinder. A driving member for rotating the cam gear 32 is not limited to the rack 36, but may be a driving gear in which teeth are not cut all around its circumference, such as a fan-shaped gear.

Figure 2:
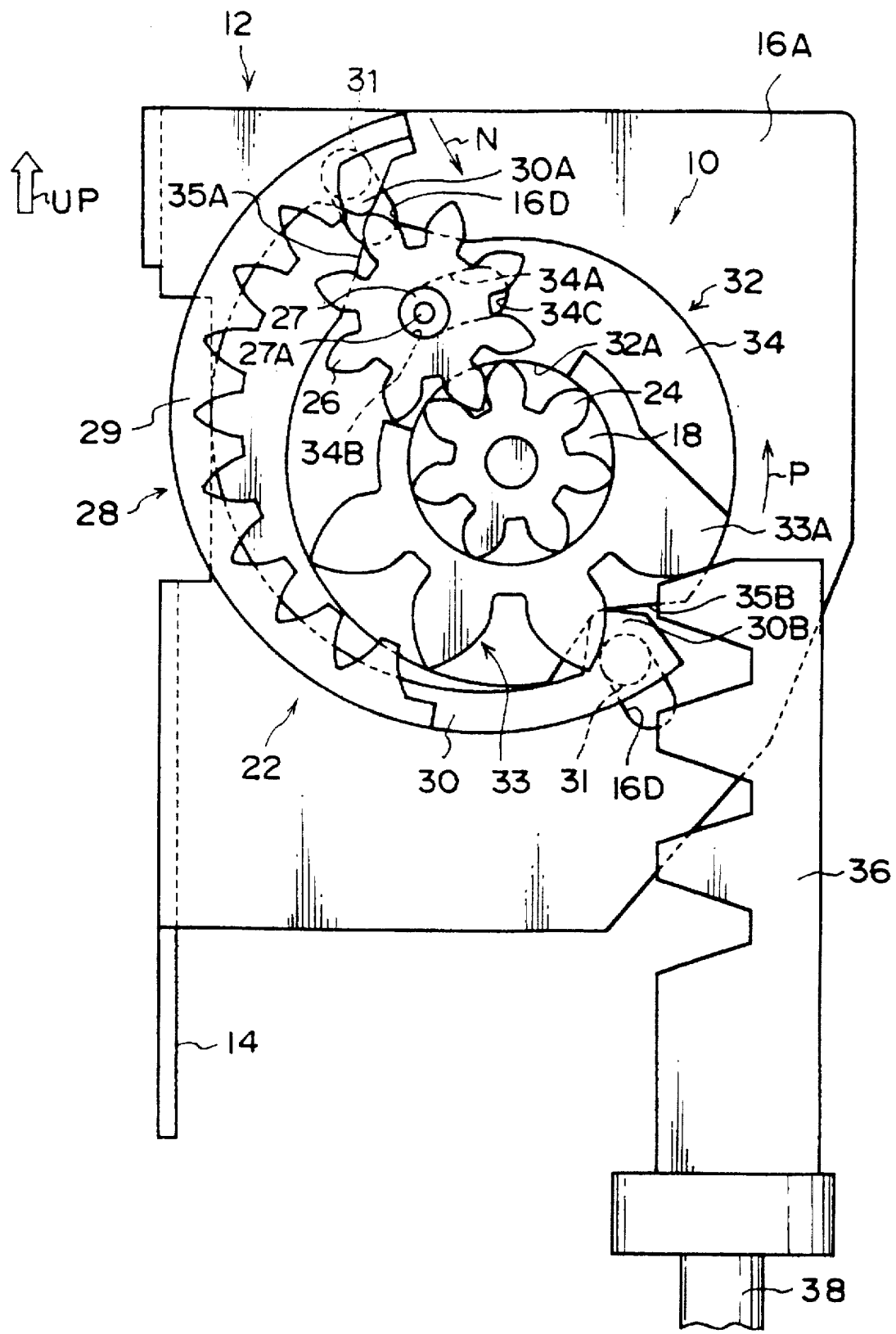
FIG. 2 is a side view showing the initial state of the pretensioner as viewed in the direction of arrow R in FIG. 1.

As shown in FIG. 2, an elongated hole 34A is formed in the plate 34 of the cam gear 32. The elongated hole 34A has an arcuate shape whose center is coaxial with the cam gear 32. The elongated hole 34A is intended to guide the planetary gear 26 until the internal gear 28 engages the planetary gear 26 when the internal gear 28 moves toward the planetary gear 26 in a direction perpendicular to the axis of the sun gear 24.

In the plate 34, a triangular engagement protruding portion 35A serving as a cam portion is provided in the vicinity of the elongated hole 34A such that it projects outward in a radial direction of the cam gear 32. Also, in the plate 34, a triangular engagement notched portion 35B serving as a cam portion is formed opposite to the engagement protruding portion 35A with respect to the center of the cam gear 32.

As shown in FIG. 1, the planetary gear 28 is rotatably disposed on the cam gear 32. A spindle 27 projects from both sides of the planetary gear 26 along the axis of the planetary gear 26. Further, a pin 27A having a smaller diameter than that of the spindle 27 projects from both ends of the spindle 27 along the axis of the planetary gear 26. One end of the spindle 27 is inserted into the elongated hole 34A, and the other end is inserted into an elongated hole (not shown) which is similar to the elongated hole 34A and formed in an unillustrated cover.

A hole 16C is formed in each of the sidewall 16A and the unillustrated cover at a position corresponding to each pin 27A. Each pin 27A is inserted into the corresponding hole 16C, thereby rotatably supporting the planetary gear 26. Each pin 27A is designed to be sheared off when a predetermine load is applied thereto. When the pins 27A are sheared off, the planetary gear 26 revolves along the internal gear 28 while engaging a gear portion 29 of the internal gear 28. That is, the sun gear 24, the planetary gear 26, and the internal gear 28 form a planetary gear mechanism in which the planetary gear 26 revolves counterclockwise around the sun gear 24 and along the internal gear 28 while rotating on its axis.

As shown in FIG. 1, the internal gear 28 is formed substantially in a semicircular shape, in which the gear portion 29 having internal teeth and a cam 30 are formed integrally in the direction of thickness. The cam 30 is located between the gear portion 29 and the sidewall 16A. A pin 31 projects toward the sidewall 16A from each longitudinal end of the cam 30. Elongated holes 16D are formed in the sidewall 16A at positions corresponding to these pins 31. The elongated holes 16D are disposed such that their longitudinal center lines intersect the axis of the sun gear 24 at right angles. Triangular protrusions 30A and 30B serving as abutting portions are formed on the cam 30 at positions corresponding to the pins 31 such that they project toward the center of the sun gear 24.

The sun gear 24 and the cam gear 32 are disposed such that the tip portion of the protrusion 30A engage the tip portion of the engagement protruding portion 35A of the cam gear 32 and that the tip portion of the protrusion 30B engages the bottom portion of the engagement notched portion 35B. As shown in FIG. 2, the spindle 27 of the planetary gear 26 is positioned at one end 34B of the elongated hole 34A formed in the cam gear 32. In this initial state, each pin 31 of the internal gear 28 is positioned at the longitudinally (in the direction of arrow UP in FIG. 2) upper end of the elongated hole 16D, and the planetary gear 26 is not engaged with the internal gear 28. Accordingly, the planetary gear 26 and the winding shaft 18 can freely rotate, thereby allowing the webbing 20 to be freely taken up or drawn out. That is, the arrangement and dimensions of members of the clutch portion 22 are designed such that in the initial state the tip portion of the protrusion 30A of the internal gear 28 engages the tip portion of the engagement protruding portion 35A of the cam gear 32 and also that the tip portion of the protrusion 30B engages the bottom portion of the engagement notched portion 35B.

Figure 3:
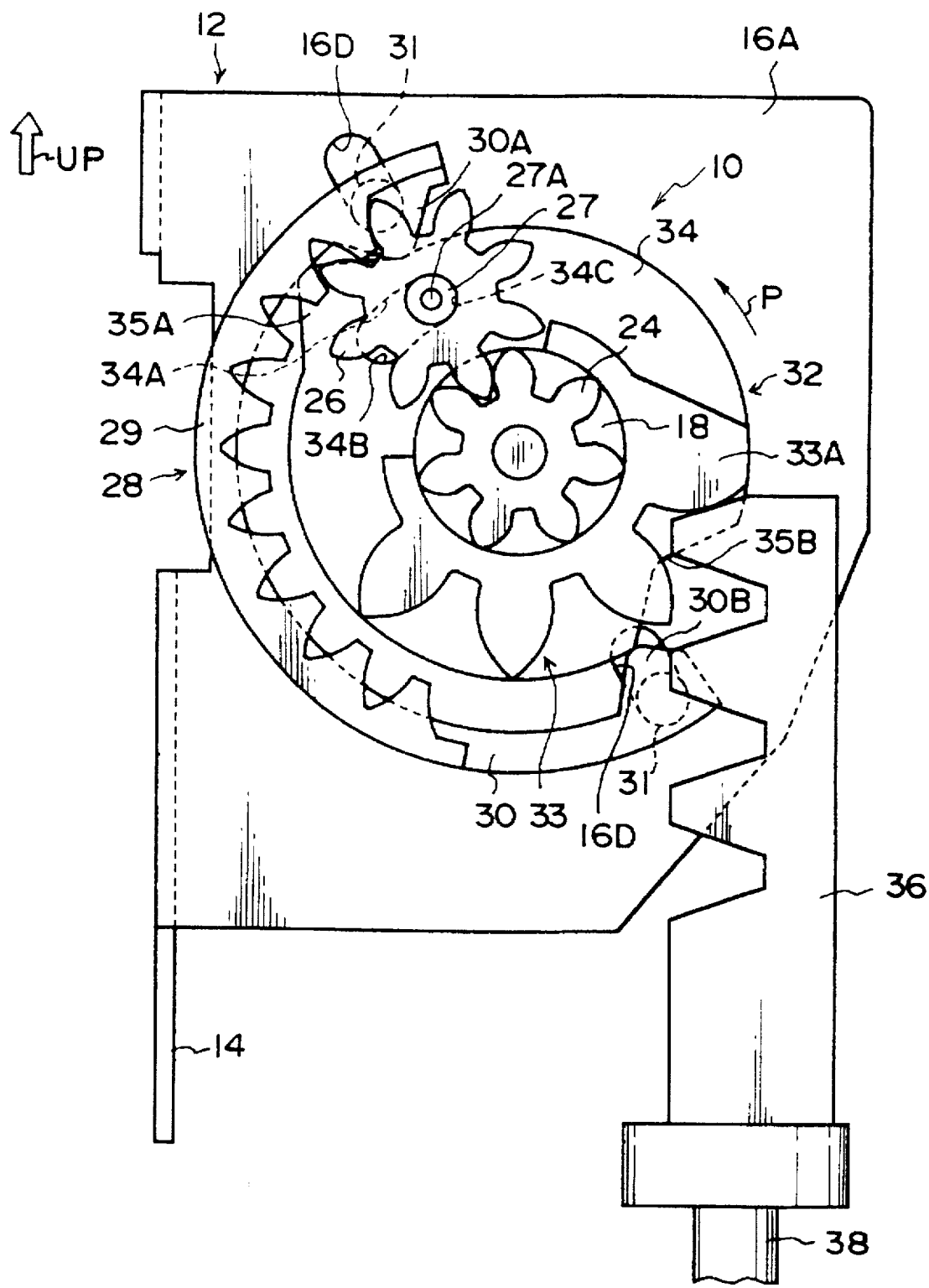
FIG. 3 is a side view showing a state after a cam gear is slightly rotated from the state of FIG. 2.

As shown in FIG. 3, when due to cancellation of engagement between the engagement protruding portion 35A and the protrusion 30A and between the engagement notched portion 35B and the protrusion 30B, each pin 31 of the internal gear 28 slides downward along the corresponding elongated hole 16D to the longitudinally lower end portion of the elongated hole 16D, the planetary gear 26 engages the gear portion of the internal gear 28. That is, the gear mechanism of the present embodiment is composed of the sun gear 24, the planetary gear 26, the internal gear 28, and the cam gear 32.

In the initial state shown in FIG. 2, the starting end gear 33A of the gear 33 of the cam gear 32 is held in the state of engaging the rack 36. As the piston 40 moves, the rack 36 moves upward, thereby rotating the cam gear 32.

An unillustrated gas generator is disposed in the pretensioner 10. The gas generator is adapted to ignite and generate a large amount of gas upon rapid deceleration of the vehicle. This gas generator communicates with a space behind the piston 40 within an unillustrated cylinder. Accordingly, when the gas generator ignites and generates a large amount of gas, the gas is fed to the space behind the piston 40 within the cylinder.

The other end portion of the winding shaft 18 projects outward through the sidewall 16B and reaches an unillustrated lock mechanism portion which is actuated upon rapid deceleration of the vehicle. Since this lock mechanism portion is similar to a conventional lock mechanism which locks the winding shaft 18 in response to rapid deceleration of the vehicle or to an acceleration of drawing out the webbing 20 so as to stop the winding shaft 18 from rotating in the unwinding direction, the description of the lock mechanism portion is omitted.

Next, the operation of the present embodiment having the structure described above will now be described.

In the pretensioner 10 having the structure described above, in the off state, i.e. when the vehicle is traveling in a normal manner, the clutch portion 22 is held in the initial state as shown in FIG. 2. That is, the tip portion of the protrusion 30A of the internal gear 28 engages the tip portion of the engagement protruding portion 35A of the cam gear 32, and the tip portion of the protrusion 30B engages the bottom portion of the engagement notched portion 35B. Consequently, the planetary gear 26 is kept apart from the internal gear 28. Accordingly, the clutch portion 22 does not prevent the winding shaft 18 from rotating freely, so that the winding shaft 18 can rotate freely while rotating the planetary gear 26. This allows the webbing 20 to be freely taken up or drawn out.

Upon rapid deceleration of the vehicle, an unillustrated gas generator ignites and generates a large amount of gas. The generated gas flows into a space behind the piston 40 within the unillustrated cylinder. As a result, the piston 40 disposed within the cylinder moves the rack 36 upward (in the direction of arrow UP in FIG. 2) from its initial position. Accordingly, the rack 36 pushes up the starting end gear portion 33A, which is already in contact with the rack 36 in the initial state, thereby rotating the cam gear 32 counterclockwise (in the direction of arrow P in FIG. 2). As the cam gear 32 rotates, the clutch portion 22 shifts from the initial state shown in FIG. 2 to the on state shown in FIG. 3.

In the on state, the engagement between the tip portion of the protrusion 30A and the engagement protruding portion 35A is canceled, and the engagement between the tip portion of the cam 30B and the bottom portion of the engagement notched portion 35B is canceled while the tip portion of the cam 30B is being subjected to a downwardly pressing force imposed by a slope of the engagement notched portion 35B. Thus, while the pins 31 are being guided along the respective elongated holes 16D, the internal gear 28 slides in the direction of arrow N in FIG. 2. As a result, the gear portion 29 of the internal gear 28 engages the planetary gear 26.

Accordingly, as compared with a conventional pretensioner in which sidewalls of gears collide, a load of collision can be made smaller. After the internal gear 28 engages the planetary gear 26, the planetary gear 26 begins to revolve around the sun gear 24.

As shown in FIG. 3, as the cam gear 32 rotates counterclockwise, the spindle 27 relatively moves from one end 34B of the elongated hole 34A in the cam gear 32 to the other end 34C. From this state of the spindle 27 abutting the other end 34C of the elongated hole 34A, when the rack 36 further moves upward to further rotate the cam gear 32 counterclockwise, a force of rotation of the cam gear 32 exceeds a predetermined value. This causes the pin 27A of the planetary gear 26 to be sheared off. Thus, with the spindle 27 being in contact with the other end 34C of the elongated hole 34A, the planetary gear 26 revolves around the sun gear 24 as the cam gear 32 rotates.

Figure 4:
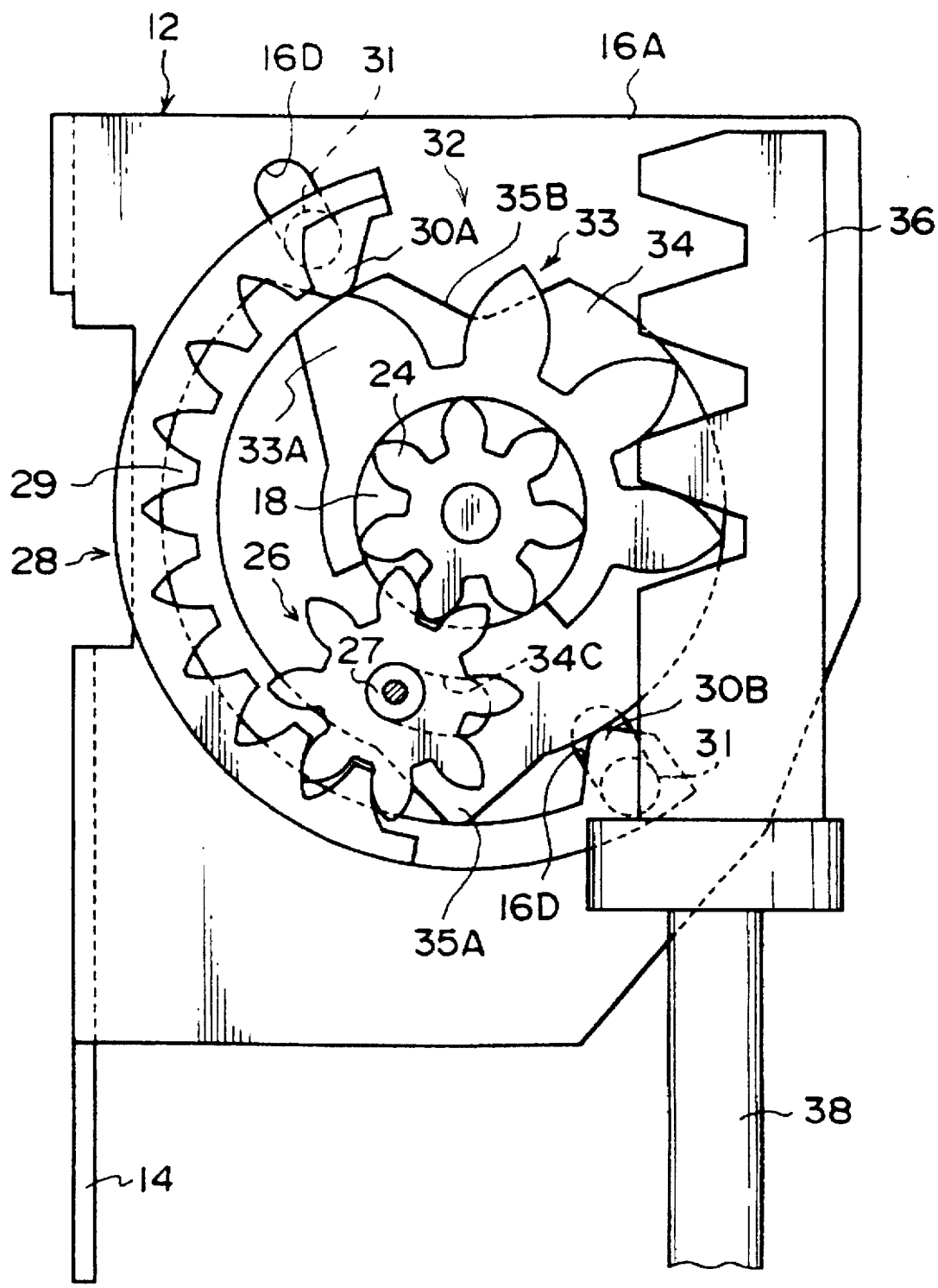
FIG. 4 is a side view showing a state after the cam gear is rotated from the state of FIG. 3.

That is, as the cam gear 32 rotates from the state of FIG. 3 to the state of FIG. 4, the gear portion 29 of the internal gear 28 causes the planetary gear 26 to revolve along the gear portion 29 and around the sun gear 24 and to rotate on its axis. Accordingly, the sun gear 24 engaged with the planetary gear 26 rotates counterclockwise. As the sun gear 24 rotates, the winding shaft 18 is forcibly rotated in the direction of winding up the webbing 20 (in the direction of arrow P in FIG. 3), thereby forcibly tensing the webbing 20. This further fastens the webbing 20 onto a passenger so as to restrain the passenger. Since the rotational speed of the sun gear 24 is increased by the planetary gear 26, the webbing is quickly taken up onto the winding shaft 18.

In the present embodiment, the cam gear 32 causes the internal gear 28 to slide in order to engage the internal gear 28 with the planetary 26. This reduces a load of collision as compared with the case where sidewalls of gears abruptly collide. Accordingly, as compared with a conventional gear mechanism, the strength of gear teeth required by the present embodiment is smaller with resultant lower cost of manufacture, and the present embodiment enables the webbing to be more smoothly taken up upon rapid deceleration of the vehicle.

According to the present embodiment, the rack 36 is already in contact with the starting end gear 33A of the cam gear 32 in the initial state, thereby avoiding abrupt collision of the rack 36 with the gear 33 of the cam gear 32.

The present invention is applicable to the case where the sun gear 24 is not connected to the winding shaft 18. That is, the sun gear 24 may be connected to a rotational spindle of a lever or the like which transmits a tensile force to the intermediate portion of the webbing 20.

What is claimed is:

1. A gear mechanism comprising:
   a sun gear;
   a planetary gear which is disposed so as to continuously engage said sun gear, and which revolves around said sun gear while rotating on its own axis when said gear mechanism is operated;
   an internal gear which is disposed so as to be movable in a direction perpendicular to the axis of said sun gear so as to engage said planetary gear and which is kept apart from said planetary gear when said gear mechanism is non-operated and engages said planetary gear when said gear mechanism is operated; and
   a cam gear which rotatably supports said planetary gear, said cam gear moving said internal gear in a direction perpendicular to the axis of said sun gear, upon receiving an external driving force, so as to engage said internal gear with said planetary gear, and said cam gear being rotated so as to revolve said planetary gear around said sun gear.

2. A gear mechanism according to claim 1, wherein said internal gear has an abutting portion which abuts said cam gear when said gear mechanism is non-operated.

3. A gear mechanism according to claim 2, wherein said cam gear has a cam portion which abuts said abutting portion of said internal gear when said gear mechanism is non-operated, and said cam portion cancels the abutment with said abutting portion of said internal gear when said gear mechanism is operated.

4. A gear mechanism according to claim 3, wherein said cam portion has a protruding portion and a notched portion, and said protruding portion and said notched portion engage said abutting portion of said internal gear when said gear mechanism is non-operated.

5. A gear mechanism according to claim 1, wherein said cam gear has a planetary gear guiding/supporting portion which supports a rotating shaft of said planetary gear and guides said rotating shaft to a predetermined direction.

6. A gear mechanism according to claim 1, wherein when said gear mechanism is operated, said cam gear moves said internal gear.

7. A pretensioner which, upon rapid deceleration of a vehicle, pulls a webbing in the direction of restraining a passenger, said pretensioner comprising:
a sun gear for applying a tensile force to a portion of the webbing;
a planetary gear which is disposed so as to continuously engage said sun gear, and which revolves around said sun gear while rotating on its own axis upon rapid deceleration of the vehicle;
an internal gear which is disposed so as to be movable in a direction perpendicular to the axis of said sun gear so as to engage said planetary gear, said internal gear being kept apart from said planetary gear when the vehicle is in a normal state and engaging said planetary gear upon rapid deceleration of the vehicle; and
a cam gear which rotatably supports said planetary gear, said cam gear receiving an external driving force, upon rapid deceleration of the vehicle, to move said internal gear in a direction perpendicular to the axis of said sun gear so that said internal gear engages said planetary gear, and said cam gear being rotated so as to revolve said planetary gear around said sun gear.

8. A pretensioner according to claim 7, wherein said internal gear has an abutting portion which abuts said cam gear when the vehicle is in the normal state.

9. A pretensioner according to claim 8, wherein said cam gear has a cam portion which abuts said abutting portion of said internal gear when the vehicle is in the normal state, and said cam portion cancels the abutment with said abutting portion of said internal gear upon rapid deceleration of the vehicle.

10. A pretensioner according to claim 9, wherein said cam portion has a protruding portion and a notched portion, and said protruding portion and said notched portion engage said abutting portion of said internal gear when the vehicle is in the normal state.

11. A pretensioner according to claim 7, wherein said cam gear has a planetary gear guiding/supporting portion which supports a rotating shaft of said planetary gear and guides said rotating shaft to a predetermined direction.

12. A pretensioner according to claim 7, wherein upon rapid deceleration of the vehicle, said cam gear rotates so as to move said internal gear.

13. A pretensioner according to claim 7, further comprising:
a rack for applying a driving force to said cam gear upon rapid deceleration of the vehicle.

14. A pretensioner according to claim 13, wherein said cam gear has a gear portion which is engagable with said rack.

15. A pretensioner which, upon rapid deceleration of a vehicle, pulls the webbing in the direction of restraining a passenger by forcibly rotating a winding shaft for winding a webbing, said pretensioner comprising:
a sun gear which is connected to said winding shaft and rotates integrally with said winding shaft;
a planetary gear which is disposed so as to continuously engage the sun gear, and which revolves around said sun gear while rotating on its own axis upon rapid deceleration of a vehicle;
an internal gear which has an abutting portion and is disposed so as to be movable in a direction perpendicular to the axis of said sun gear so as to engage said planetary gear, said internal gear being kept apart from said planetary gear when the vehicle is in a normal state and engaging said planetary gear upon rapid deceleration of the vehicle; and
a cam gear which rotatably supports said planetary gear and has a cam portion abuttable with said abutting portion of said internal gear, said cam gear maintaining abutment between said cam portion and said abutting portion, when the vehicle is in the normal state, so as to keep said internal gear apart from said planetary gear, said cam gear receiving an external driving force, upon rapid deceleration of the vehicle, so as to cancel engagement between said cam portion and said abutting portion and to move said internal gear in a direction perpendicular to the axis of said sun gear so as to engage said internal gear with said planetary gear, and said cam gear being rotated so as to revolve said planetary gear around said sun gear.

16. A pretensioner according to claim 15, wherein said cam portion has a protruding portion and a notched portion, and said protruding portion and said notched portion engage said abutting portion of said internal gear when the vehicle is in the normal state.

17. A pretensioner according to claim 15, wherein said cam gear has an elongated hole which supports a rotating shaft of said planetary gear and guides said rotating shaft to a predetermined direction.

18. A pretensioner according to claim 15, wherein upon rapid deceleration of the vehicle, said cam gear rotates so as to move said internal gear.

19. A pretensioner according to claim 15, further comprising:
a rack for applying a driving force to said cam gear upon rapid deceleration of the vehicle.

20. A pretensioner according to claim 19, wherein said cam gear has a gear portion, a start end gear of said gear portion being provided so as to abut said rack when the vehicle is in the normal state, and a remaining portion of said gear portion being provided so as to abut said rack upon rapid deceleration of the vehicle.

* * * * *